(12) United States Patent
Pudipeddi et al.

(10) Patent No.: US 7,603,504 B2
(45) Date of Patent: Oct. 13, 2009

(54) REDUCING CORE WAKE-UP LATENCY IN A COMPUTER SYSTEM

(75) Inventors: Bharadwaj Pudipeddi, Campbell, CA (US); James S. Burns, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 11/959,339

(22) Filed: Dec. 18, 2007

(65) Prior Publication Data

US 2009/0158068 A1    Jun. 18, 2009

(51) Int. Cl.
*G06F 13/24* (2006.01)
(52) U.S. Cl. .................. 710/261; 713/330
(58) Field of Classification Search ......... 713/300–320, 713/324–330; 710/260–262
See application file for complete search history.

(56) References Cited

U.S. PATENT DOCUMENTS

| | | | |
|---|---|---|---|
| 5,073,943 A * | 12/1991 | Chapman | 381/86 |
| 5,758,137 A * | 5/1998 | Armstrong et al. | 713/502 |
| 6,523,073 B1 * | 2/2003 | Kammer et al. | 710/48 |
| 2008/0010563 A1 * | 1/2008 | Nishimura | 714/55 |
| 2008/0098246 A1 * | 4/2008 | Kim | 713/323 |

* cited by examiner

*Primary Examiner*—Clifford H Knoll
(74) *Attorney, Agent, or Firm*—Murthy S.K.

(57) ABSTRACT

A power control unit (PCU) may reduce the core wake-up latency in a computer system by concurrently waking-up the remaining cores after the first core is woken-up. The power control unit may detect arrival of a first, second, and a third interrupt directed at a first, second, and a third core. The power control unit may check whether the second interrupt occurs within a first period, wherein the first period is counted after waking-up of the first core is complete. The power control unit may then wake-up the second and the third core concurrently if the second interrupt occurs within the first period after the wake-up activity of the first core is complete. The first period may at least equal twice the time required for a first credit to be returned and next credit to be accepted.

21 Claims, 3 Drawing Sheets

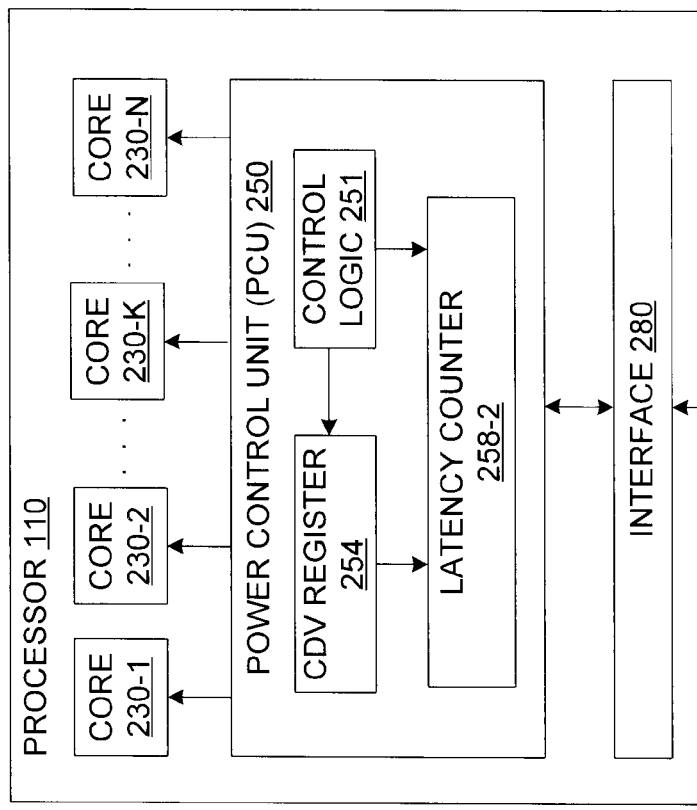
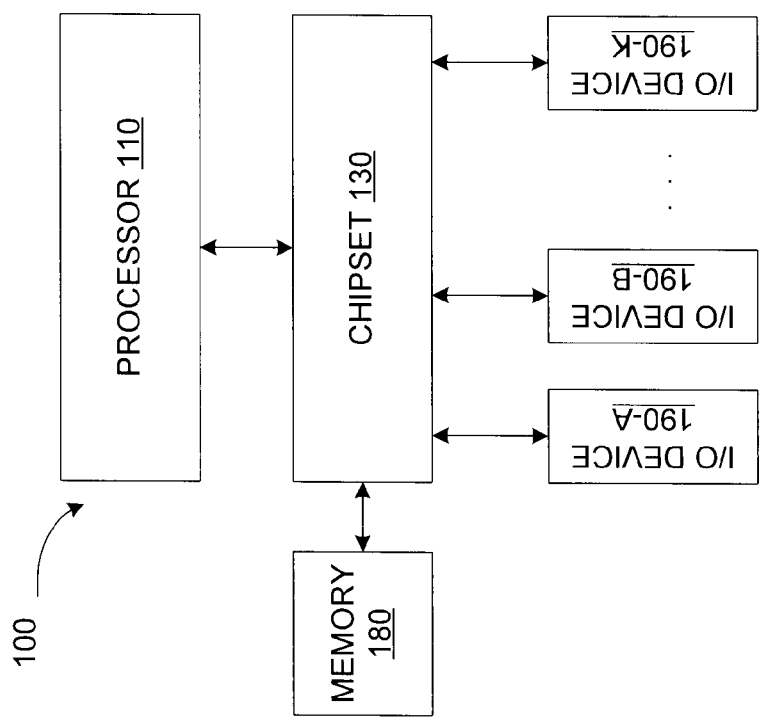

REDUCING CORE WAKE-UP LATENCY IN A COMPUTER SYSTEM

BACKGROUND

In a multi-core processor, cores are put into sleep states to save power and waking-up the cores from the sleep state may require regulatory process, which may cause latency. If a stream of interrupts targeting different sleeping cores is in process one at a time, then the last interrupt in the line absorbs the cumulative latency of all the interrupts ahead of the last interrupt. In a multi-core processor, the cumulative latency may be in the order of milliseconds, which may cause irregular spikes, spurious transactions, and timeouts.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a computer system, including core wake-up latency reduction technique according to one embodiment.

FIG. 2 illustrates a processor in which core wake-up latency reduction technique is supported according to one embodiment.

DETAILED DESCRIPTION

Figure 3:
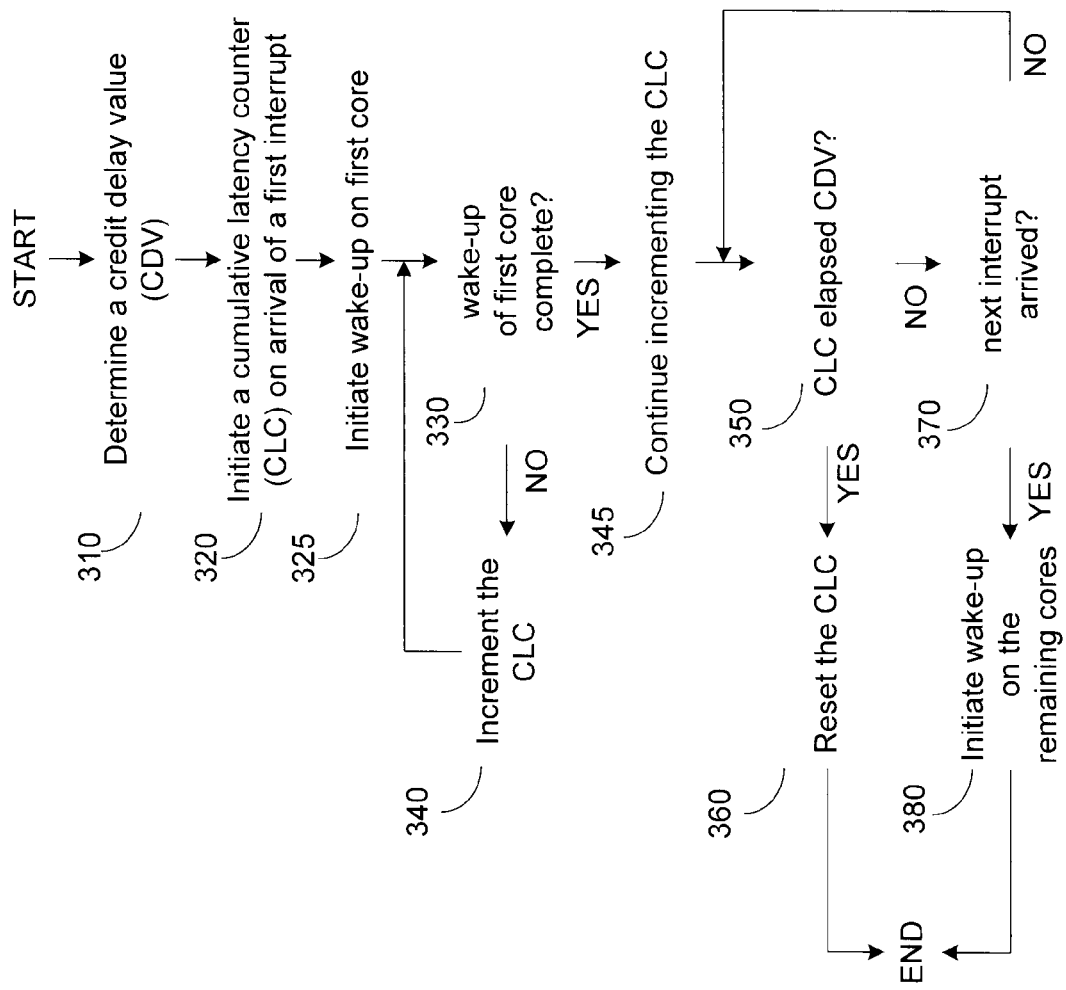
FIG. 3 is a flow diagram illustrating operations that may be performed by the processor according to one embodiment.

The following description describes embodiments of a technique for reducing core wake-up latency in a computer system or computer system component such as a microprocessor. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

A computing device 100, which may support core wake-up latency reduction feature in accordance with one embodiment, is illustrated in FIG. 1. In one embodiment, the computing device 100 may comprise a processor 110, a chipset 130, a memory 180, and I/O devices 190-A to 190-K.

The chipset 130 may comprise one or more integrated circuits or chips that operatively couple the processor 110, the memory 180, and the I/O devices 190. In one embodiment, the chipset 130 may comprise controller hubs such as a memory controller hub and an I/O controller hub to, respectively, couple with the memory 180 and the I/O devices 190. The chipset 130 may receive transactions generated by the I/O devices 190 on links such as the PCI Express links and may forward the transactions to the memory 180 or the processor 110. Also, the chipset 130 may generate and transmit transactions to the memory 180 and the I/O devices 190 on behalf of the processor 110.

The memory 180 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in a system such as the computing system 100.

The processor 110 may manage various resources and processes within the processing system 100 and may execute software instructions as well. The processor 110 may interface with the chipset 130 to transfer data to the memory 180 and the I/O devices 190. In one embodiment, the processor 110 may receive one or more interrupts and process the interrupts to reduce core wake-up latency. In one embodiment, the processor 110 may detect one or more streaming interrupts using a latency counter. The processor 110 may not require buffers to absorb the streaming interrupts. Such an approach may reduce the latency in processing the interrupts while avoiding cost of provisioning buffers to absorb the streaming interrupts.

A processor 110 in which core wake-up latency reduction feature is supported in accordance to one embodiment is illustrated in FIG. 2. In one embodiment, the processor 110 may comprise one or more processor cores 230-1 to 230-N, a power control unit 250, and an interface 280.

In one embodiment, the interface 280 may couple the processor 110 with the chipset 130 to send and receive data and control units. In one embodiment, the interface 280 may also receive interrupts to the processor cores 230 from one or more I/O devices 190. In one embodiment, the interface 180 may also provide the interrupts to the power control unit 250.

In one embodiment, the cores 230-1 to 230-N may process data based on the instructions. The processor cores 230-1 to 230-N may be woken-up in response to receiving the interrupts. For example, the processor core 230-1 may be woken-up in response to receiving an interrupt INT-1 and after completion of the INT-1, the processor core 230-2 may be woken-up to complete an interrupt INT-2, and after completion of the INT-2, the processor core 230-K may be woken-up to complete INT-K. As a result, the latency associated with waking-up the processor core 230-K may equal a cumulative latency of waking-up the processor cores 230-1 and 230-2. By the time the processor core 230-K is woken-up, a cumulative latency of the order of few milliseconds may occur or even a time-out event may occur. If N interrupts arrive, the time required for the Nth processor core to be woken-up to service the Nth interrupt may equal a cumulative latency of waking-up 1 to N processor cores. The overall core wake-up latency may thus equal (N×wake-up latency of a core). Cumulative latency of such magnitudes may affect the performance of the computing device 100. Waking-up all the processor cores 230 on any interrupt or increasing the time-out may also reduce the performance of the computing device 100.

In one embodiment, the power control unit (PCU) 250 may support core latency reduction technique, which may allow detection of occurrence of streaming interrupts. In one embodiment, the power control unit 250 may wake-up the processor cores 230-2 to 230-N concurrently on a next interrupt after completing the first interrupt. In one embodiment, the power control unit 250 may comprise control logic 251, a credit delay value (CDV) register 254, and a cumulative latency counter (CLC) 258.

In one embodiment, the control logic 251 may determine the credit delay value (CDV) based on the longest estimated time for a first credit to be returned and next credit to be accepted. In one embodiment, the longest estimated time for the first credit to be returned and the next credit to be accepted may be referred to as a network point-to-point delay parameter. In one embodiment, the control logic 251 may load the CDV to the CDV register 254.

In one embodiment, the cumulative latency counter (CLC) 258 may track the wake-up time of the processor cores 230. In one embodiment, the control logic 251 may detect the occurrence of a first interrupt and initiate the CLC 258 to track the wake-up time of the processor core 230-1.

In one embodiment, the control logic 251 may detect the completion of the first interrupt and may allow the CLC 258 to continue to count until CDV is elapsed if the next interrupt does not occur within CDV and to track the wake-up time of the next interrupt if the next interrupt occurs. In one embodiment, the control logic 251 may reset the CLC 258 if the count registered by the CLC 258 reaches CDV.

In one embodiment, the control logic 251 may wake-up the remaining processor cores 230-2 to 230-N, concurrently, if the next interrupt occurs before the CLC 258 reaches CDV. As a result of waking-up the remaining cores 230-2 to 230-N concurrently, the overall core wake-up latency may be lesser than that of waking-up the processor cores 230-2 to 230-N sequentially. In one embodiment, waking-up the cores 230-2 to 230-N concurrently after the first core is woken-up may result in an overall core wake-up latency equal to twice the wake-up time of a core. Such an approach may reduce core wake-up latency.

FIG. 3 illustrates operations of the processor supporting core wake-up latency reduction technique according to at least one embodiment of the invention.

In block 310, the control logic 251 may determine the credit delay value (CDV). In one embodiment, the CDV may be determined based on the time required for credit return. In one embodiment, the CDV may equal at least twice the time required for the credit return.

In block 320, the control logic 251 may initiate the CLC 258 on arrival of the first interrupt. In block 325, the control logic 251 may initiate wake-up of the first processor core 230-1. In one embodiment, the first interrupt may be directed to the first processor core 230-1.

In block 330, the control logic 251 may determine if wake-up activity of the first processor core 230-1 is complete and control passes to block 340 if the wake-up activity of the first processor core 230-1 is not complete and to block 345 if the wake-up activity of the first processor core 230-1 is complete.

In block 340, the CLC 258 may increment the count and control passes to block 330. In block 345, the CLC 258 may continue to count towards CDV.

In block 350, the control logic 251 may check whether the count registered by the CLC 258 elapsed CDV and control passes to block 360 if the CLC 258 elapses CDV and to block 370 otherwise.

In block 360, the control logic 251 may reset the CLC 258. In one embodiment, if a next interrupt does not arrive within the CDV, the control logic 251 may reset the CLC 258 in response to CLC 258 reaching CDV.

In block 370, the control logic 251 may determine whether the next interrupt has arrived and control passes to block 380 if the next interrupt has arrived within the CDV and to block 350 otherwise.

In block 380, the control logic 251 may initiate wake-up on the remaining cores 230-2 to 230-N.

Figure 4:
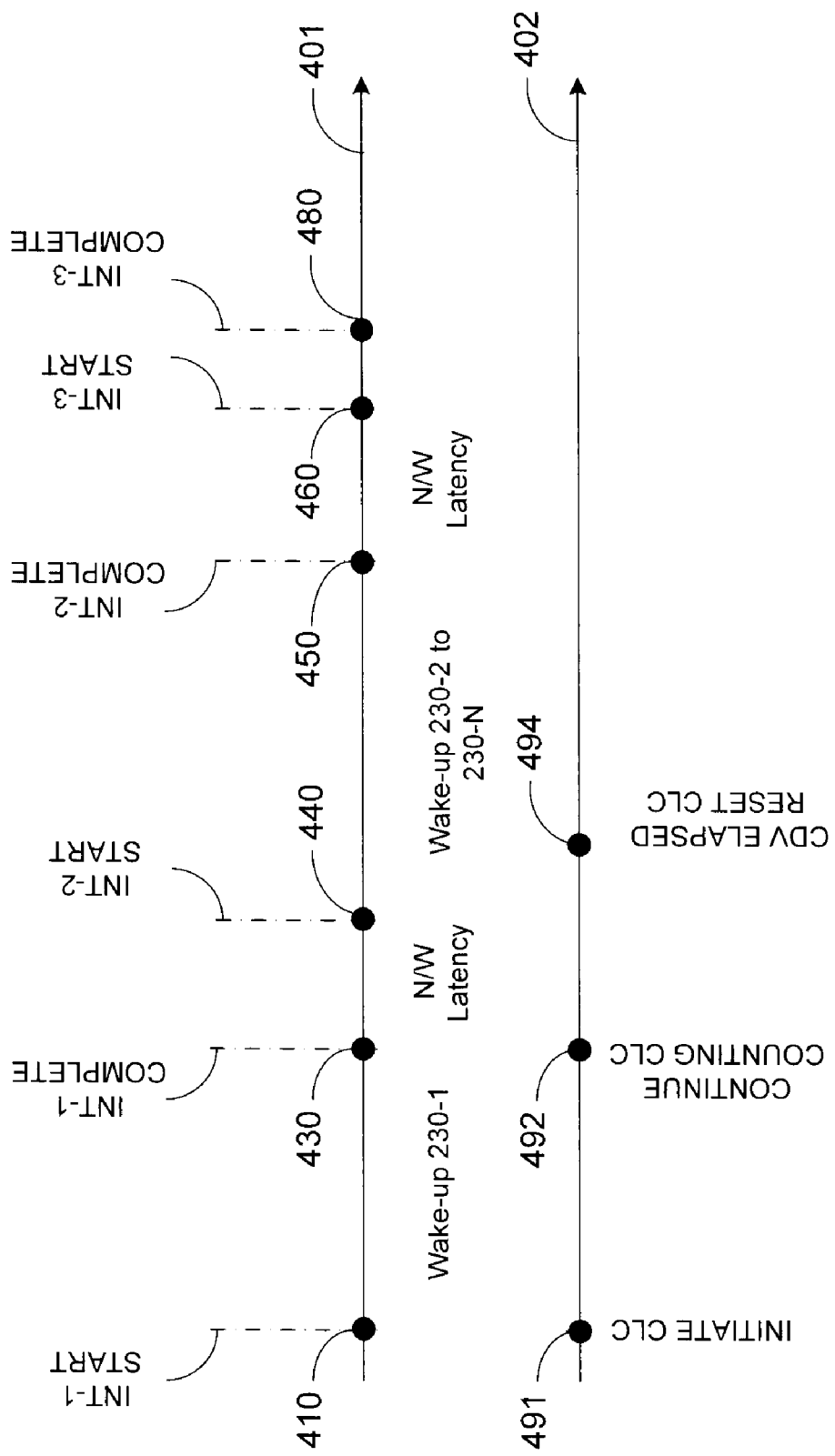
FIG. 4 illustrates a timing-diagram depicting reduction in core wake-up latency in accordance with at least one embodiment of the invention.

A timing diagram illustrating reduction in core wake-up latency with at least one embodiment of the invention is illustrated in FIG. 4. For illustration, reduction in core wake-up latency is illustrated with three interrupts INT-1, INT-2, and INT-K directed at the processor cores 230-1, 230-2, and 230-K, respectively. However, the core wake-up latency reduction technique may be applicable to any number of interrupts.

In one embodiment, axis 401 may represent core wake-up activity and axis 402 may represent cumulative latency counter (CLC) activity. In one embodiment, the event 410 may correspond to occurrence of the interrupt INT-1 which is directed at the processor core 230-1. In one embodiment, the control logic 251 may detect the occurrence of INT-1 and may initiate the CLC 258 as indicated by the event 491 and block 320. In one embodiment, the control logic 251, as indicated in block 345 and event 492, may allow the CLC 258 to count past the event 430, which may represent completion of INT-1.

In one embodiment, the control logic 251, as indicated by event 440, may detect the occurrence of the next interrupt INT-2. As a result of event 440, the CLC 258 may still continue to count. In one embodiment, on occurrence of the event 440, the control logic 251, as indicated in block 380, may initiate wake-up activity on the remaining processor cores 230-2 and 230-3. As the remaining processor cores 230-2 and 230-3 are woken-up concurrently, the overall core wake-up latency may be reduced. However, if the INT-2 does not occur and if the CDV elapses as indicated by event 494, the control logic 251 may reset the CLC 258.

In one embodiment, the event 450 may represent completion of INT-2. Also, as the processor core 230-K is awake, the interrupt INT-K directed at the processor core 230-K may be readily serviced. As a result, the time-outs may not occur before the INT-K is serviced. Such an approach may allow reduction in the core wake-up latency.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
   detecting arrival of a first, second, and a third interrupt directed at a first, second, and a third core,
   checking whether the second interrupt occurs within a first period, wherein the first period is counted after waking-up of the first core is complete, and
   waking-up the second and the third core concurrently if the second interrupt occurs within the first period.

2. The method of claim 1, wherein the first period is determined based on a point-to-point network delay experienced by a transaction.

3. The method of claim 2, wherein the point-to-point network delay may at least equal twice the time required for a credit of a transaction to return.

4. The method of claim 1 further comprises:
   initiating a cumulative latency counter to track wake-up activity of the first core in response to receiving the first interrupt,
   allowing the cumulative latency counter to count after waking-up of the first core is complete, and
   resetting the cumulative latency counter if the first period elapses without receiving the second interrupt.

5. The method of claim 4 further comprises tracking the wake-up time of the second core in response to occurrence of the second interrupt during the first period.

6. The method of claim 5 further comprises servicing the third interrupt using the third core, wherein the third core is in a woken-up state before receiving the third interrupt.

7. The method of claim 1, wherein a cumulative latency of waking-up the first, second, and the third cores concurrently is less than the latency of waking-up the first, second, and the third cores sequentially.

8. An apparatus comprising:
   a first, a second, and a third core, and
   a power control unit coupled to the first, second, and the third core,
   wherein the power control unit is to detect a first, second, and a third interrupt directed at the first, second, and a third core,
   wherein the power control unit is to check whether the second interrupt occurs within a first period, wherein the first period is counted after waking-up of the first core is complete, and
   wherein the power control unit is to wake-up the second and the third core concurrently if the second interrupt occurs within the first period.

9. The apparatus of claim 8 the power control unit further comprises control logic, wherein the control logic is to determine the first period based on a point-to-point network delay.

10. The apparatus of claim 9, wherein the point-to-point network delay may equal at least twice the time required for a credit of a transaction to return.

11. The apparatus of claim 8 further comprises:
    a cumulative latency counter coupled to the control logic,
    wherein the control logic is to initiate the cumulative latency counter to track wake-up activity of the first core in response to receiving the first interrupt,
    wherein the control logic is to allow the cumulative latency counter to count after waking-up of the first core is complete, and
    wherein the control logic is to reset the cumulative latency counter if the first period elapses without receiving the second interrupt.

12. The apparatus of claim 11, wherein the cumulative latency counter is to track the wake-up time of the second core in response to occurrence of the second interrupt during the first period.

13. The apparatus of claim 12, wherein the third core is to service the third interrupt, wherein the third core is in a woken-up state before receiving the third interrupt.

14. The apparatus of claim 8, wherein a cumulative latency of waking-up the first, second, and the third cores concurrently is less than the latency of waking-up the first, second, and the third cores sequentially.

15. A computing device comprising:
    a plurality of input-output devices,
    a chipset coupled to plurality of input-output devices,
    a multi-core processor coupled to the chipset, wherein the multi-core processor is to include a first, a second, and a third core and a power control unit coupled to the first, second, and the third core,
    wherein the power control unit is to detect a first, second, and a third interrupt directed at the first, second, and a third core,
    wherein the power control unit is to check whether the second interrupt occurs within a first period, wherein the first period is counted after waking-up of the first core is complete, and
    wherein the power control unit is to wake-up the second and the third core concurrently if the second interrupt occurs within the first period.

16. The computing device of claim 15 the power control unit is to determine the first period based on a point-to-point network delay.

17. The computing device of claim 16, wherein the point-to-point network delay may equal at least twice the time required for a credit of a transaction generated an input-out device of the plurality of input-output devices to return.

18. The computing device of claim 15, wherein the power control unit is to,
    track wake-up activity of the first core in response to receiving the first interrupt,
    track time duration after waking-up of the first core is complete, and
    stop tracking the time duration if the first period elapses without receiving the second interrupt.

19. The computing device of claim 18, wherein the power control unit is to track the wake-up time of the second core in response to occurrence of the second interrupt during the first period.

20. The computing device of claim 19, wherein the third core is to service the third interrupt, wherein the third core is in a woken-up state before receiving the third interrupt.

21. The computing device of claim 15, wherein a cumulative latency of waking-up the first, second, and the third cores concurrently is less than the latency of waking-up the first, second, and the third cores sequentially.

* * * * *